(12) United States Patent
Jain (10) Patent No.: US 9,405,803 B2
(45) Date of Patent: Aug. 2, 2016

(54) RANKING SIGNALS IN MIXED CORPORA ENVIRONMENTS

(71) Applicant: Google, Inc., Mountain View, CA (US)

(72) Inventor: Ankit Jain, Milpitas, CA (US)

(73) Assignee: GOOGLE INC., Mountain View, CA (US)

(*) Notice: Subject to any disclaimer, the term of this patent is extended or adjusted under 35 U.S.C. 154(b) by 288 days.

(21) Appl. No.: 13/868,333

(22) Filed: Apr. 23, 2013

(65) Prior Publication Data

US 2014/0317073 A1    Oct. 23, 2014

(51) Int. Cl.
*G06F 17/30* (2006.01)

(52) U.S. Cl.
CPC ...... *G06F 17/3053* (2013.01); *G06F 17/30648* (2013.01); *G06F 17/30867* (2013.01)

(58) Field of Classification Search
CPC .......... G06F 17/3053; G06F 17/30648; G06F 17/30867
See application file for complete search history.

(56) References Cited

U.S. PATENT DOCUMENTS

| | | | |
|---|---|---|---|
| 7,536,417 B2* | 5/2009 | Walsh | G06F 17/30861 |
| 7,805,438 B2 | 9/2010 | Liu et al. | |
| 7,818,315 B2* | 10/2010 | Cucerzan | G06F 17/30864 707/723 |
| 7,853,589 B2* | 12/2010 | Svore | G06F 17/3089 707/728 |
| 7,966,309 B2 | 6/2011 | Shacham et al. | |
| 8,078,607 B2 | 12/2011 | Oztekin et al. | |
| 8,150,843 B2* | 4/2012 | Chitiveli | G06F 17/30648 707/705 |
| 8,280,900 B2* | 10/2012 | Pickens | G06F 17/30672 707/765 |
| 8,359,309 B1 | 1/2013 | Provine et al. | |
| 8,583,632 B2* | 11/2013 | Libes | G06F 17/30864 707/723 |
| 8,713,001 B2* | 4/2014 | Roy | G06F 17/30648 707/722 |
| 2005/0144162 A1 | 6/2005 | Liang | |
| 2007/0185847 A1* | 8/2007 | Budzik | G06F 17/30389 |
| 2009/0063265 A1* | 3/2009 | Nomula | G06F 17/30864 705/14.66 |
| 2010/0082510 A1* | 4/2010 | Gao et al. | 706/20 |
| 2010/0082640 A1* | 4/2010 | Wexler | G06F 17/30867 707/748 |

OTHER PUBLICATIONS

ISR and Written Opinion in PCT/US2014/034796 mailed Aug. 13, 2014.
Davison, "The potential of the metasearch engine," Proceedings of the American Society for Information Science and Technology, Nov. 1, 2004, 393-402.
Radovanovic, et al., "CatS: A Classification-Powered Meta Search Engine" Advances in Web Intelligence and Data MiningSpringer-Verlag vol. 23, Sep. 10, 2006, 191-200.

(Continued)

*Primary Examiner* — Huawen Peng
(74) *Attorney, Agent, or Firm* — Morris & Kamlay LLP (57) ABSTRACT

A method for retrieving information may include receiving a search query within an information retrieval system. Search results responsive to the search query may be identified from a first information corpus and a second information corpus. Search results responsive to the search query may be identified from a third information corpus. A ranking signal associated with the first information corpus and the second information corpus may be determined based on the search results from the third information corpus. The search results from the first information corpus and the second information corpus may be ranked based on the ranking signal.

17 Claims, 6 Drawing Sheets

(56) References Cited

OTHER PUBLICATIONS

Raval, et al., "SEReleC (Search Engine Result Refinement and Classification)—a Meta search engine based on combinatorial search and search keyword based link classification", Advances in Eng Ineering, Science and Management (ICAESM), 2012 International Conference on, IEEE, Mar. 30, 2012, whole document.
Wu, et al., "Click-Through Prediction for News Queries", http://worldwide.espacenet.comjsearchResults?DB=EPODOC&compact=false&query=US2010299350, Nov. 25, 2010.

* cited by examiner

RANKING SIGNALS IN MIXED CORPORA ENVIRONMENTS

BACKGROUND

An information retrieval system uses terms and phrases to index, retrieve, organize and describe documents. Such information retrieval system may include a meta search engine, which may combine results of a plurality of search backends or services. When a user enters a search query in the search engine, the terms in the query are identified and used to retrieve documents from the plurality of search backends. For example, for a given search term, a search engine may return documents that are of the same type (e.g., only songs), or may also return documents that may be divided in a plurality of different logical corpora (e.g., for a given title, a meta search engine may return results that may include songs, books, videos, TV shows, etc. with the same title). The returned results may be ranked according to the individual logical corpus used in the search.

However, ranking of the individual corpus may be difficult since some corpora may be newly integrated (e.g., a newly integrated music search engine), with uneven usage patterns. Consequently, if a user performs a search of a music album title, the search results that are returned may include, for example, books with the same title, movies with the same title, and (in third place) music albums with the same title. In this regard, the result the user is most interested in will be displayed in third place instead of a first place. In this regard, an uneven usage pattern of one or more of the search backends within the meta search engine (e.g., using a very popular search backend or using a newly integrated search backend) can provide sub-optimal orderings of the final search results due to lack of appropriate levels of ranking data.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for using World Wide Web (WWW) data to classify documents for use in ranking signals in mixed corpora environments, substantially as shown in and/or described in connection with at least one of the figures, as set forth more completely in the claims.

These and other advantages, aspects and features of the present disclosure, as well as details of illustrated implementation(s) thereof, will be more fully understood from the following description and drawings.

In accordance with an example embodiment of the disclosure, a method for retrieving information may include receiving a search query within an information retrieval system. Search results responsive to the search query may be identified from a first information corpus and a second information corpus. Search results responsive to the search query may be identified from a third information corpus. A ranking signal associated with the first information corpus and the second information corpus may be determined based on the search results from the third information corpus. The search results from the first information corpus and the second information corpus may be ranked based on the ranking signal.

In accordance with another example embodiment of the disclosure, a method for retrieving information may include receiving a search query within an information corpora. Search results for the search query from at least one information corpus may be identified within the information corpora. In response to communicating the search query to at least a second information corpus, a ranking signal associated with each of the at least one information corpus within the information corpora may be received from the at least second information corpus. The ranking signal may be based on classification of search results after a search of the search query using the at least second information corpus. The information corpora may be a "small" corpora, which may include at least one corpus that is a subset of the WWW-based (or web-based) corpora, or at least one corpus that is partially or completely non-overlapping with the web-based corpora. The search results from each of the at least one information corpus may be ranked within the information corpora based on the received ranking signal.

The information corpora may include at least one non-World Wide Web (WWW) based information corpus (e.g., a corpus consisting of music documents), and at least one WWW-based (or web-based) information corpus. The at least second information corpus may include at least one WWW-based (or web-based) information corpus. The information corpora may include documents representing any kind of content, products and/or information. Examples of such documents may include movies (for a movie search engine), tracks/albums/artists (for a music search engine), books (for a books search engine), applications (or apps) for an apps search engine, and other multimedia documents.

Figure 1:
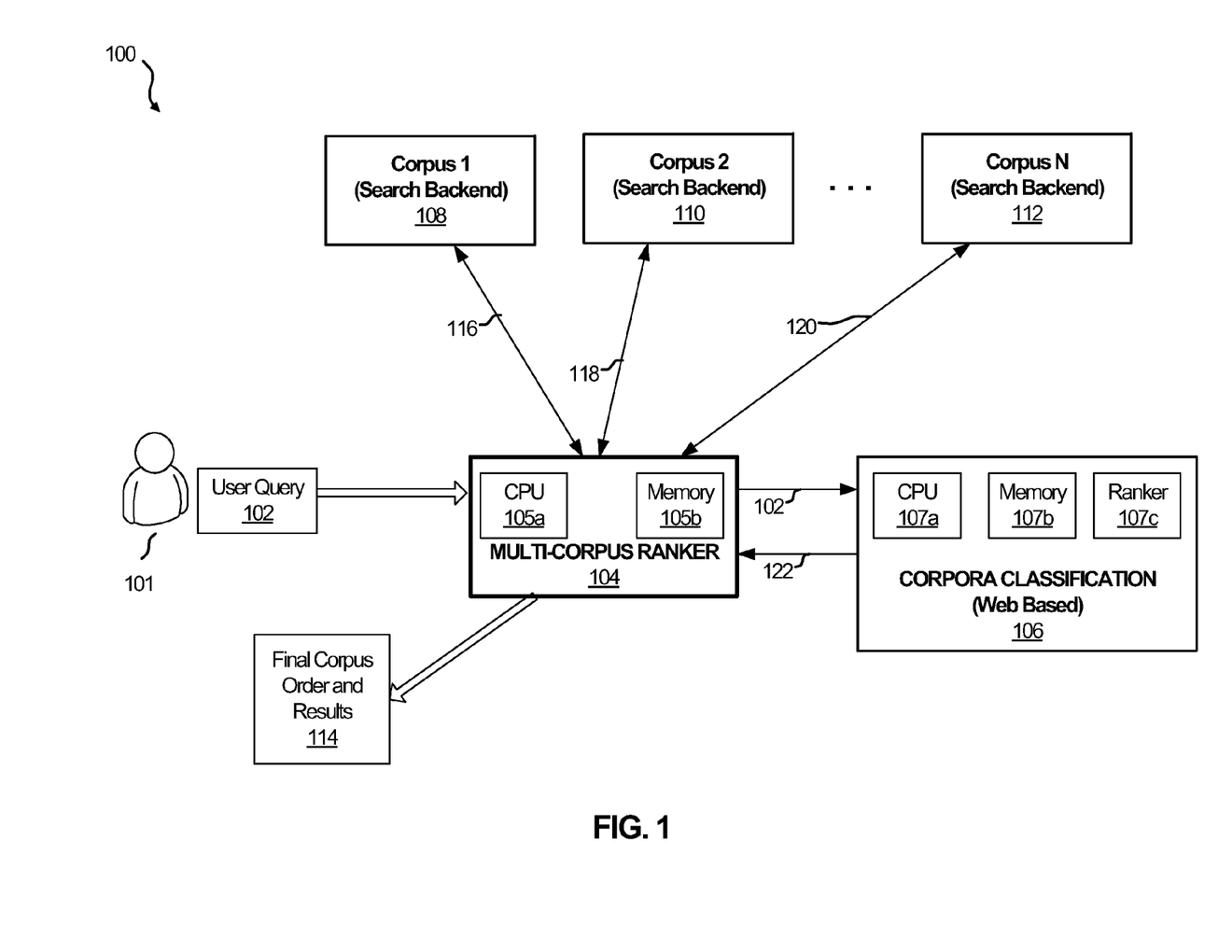
FIG. 1 is a block diagram illustrating a meta search engine architecture, in accordance with an example embodiment of the disclosure.

In accordance with another example embodiment of the disclosure, a system for a system for retrieving information may include a network device (e.g., the meta search engine ranker 104, with a CPU 105*a* and memory 105*b*, as illustrated in FIG. 1). The network device may be operable to receive a search query within an information corpora. Search results for the search query from at least one information corpus may be identified within the information corpora. In response to communicating the search query to at least a second information corpus, a ranking signal associated with each of the at least one information corpus within the information corpora may be received from the at least second information corpus. The ranking signal may be based on classification of search results after a search of the search query using the at least second information corpus. The information corpora may be a "small" corpora, which may include at least one corpus that is a subset of the WWW-based (or web-based) corpora, or at least one corpus that is partially or completely non-overlapping with the web-based corpora The search results from each of the at least one information corpus may be ranked within the information corpora based on the received ranking signal.

In accordance with yet another example embodiment of the disclosure, a machine-readable storage device, having stored thereon a computer program having at least one code section for retrieving information may be disclosed. The at least one code section may be executable by a machine for causing the machine to perform a method including receiving a search query within an information corpora. Search results for the search query from at least one information corpus may be identified within the information corpora. In response to communicating the search query to at least a second information corpus, a ranking signal associated with each of the at least one information corpus within the information corpora may be received from the at least second information corpus. The ranking signal may be based on classification of search results after a search of the search query using the at least second information corpus. The information corpora may be a "small" corpora, which may include at least one corpus that is a subset of the WWW-based (or web-based) corpora, or at least one corpus that is partially or completely non-overlapping with the web-based corpora The search results from each of the at least one information corpus may be ranked within the information corpora based on the received ranking signal.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations.

People do a large number of queries on web search engines every day. Based on the methods and systems described herein, the data collected from such search engines may be used to improve non-web search engines. We refer to such search engine systems as the web corpus or the web-based information corpus. As used herein, the term "corpus" (plural, "corpora") means a collection of documents (or data items) of a given type. As used herein, the term "WWW-based search corpora" or "WWW-based corpora" is corpora meant to include all documents available on the Internet (i.e., including, but not limited to, music-related documents, book-related documents, movie-related documents and other media-related documents). The term "non-WWW corpus" or "non WWW-based corpus" means a corpus where the corpus documents (or data items) are not available on the WWW.

The term "small" corpora may indicate corpora including at least one corpus that is a subset of the WWW-based (or web-based) corpora, or at least one corpus that is partially or completely non-overlapping with the web-based corpora. An example of "small" corpora may include corpora associated with an online media search engine. The "small" corpora may include, for example, a movie corpus (associated with a movie search engine), music corpus (associated with a music search engine), etc. Additionally, portions of the music and/or movies database may be available via an Internet search of the WWW-based corpora (i.e., such portions of the respective corpus are a subset of the WWW-based corpora), while other portions of the "small" corpora may not be available on the www-based corpora and are, therefore, non-overlapping with the WWW-based corpora.

The term "non-overlapping corpus" (e.g., a first corpus is non-overlapping with a second corpus), means that documents that may be found in one corpus, may not be found in the other corpus.

As used herein, the term "meta search engine" means a search engine comprising a mixed corpora environment, with a plurality of search backends. Each search backend may utilize a corpus associated with a certain types of documents (e.g., apps, music, books, etc.).

In some instances, mixed corpora search engines (e.g., a meta search engine) may use query-to-click ratios to determine the ordering of corpora within the search results. Such methodology may function well in a system with a lot of historical data that is equally spread across all corpora. However, this method may be deficient when one or more of the corpora have been in existence for significantly longer time than the other corpora. For example, one of the search backends in the meta search engine may be associated with applications (or apps) and may have been in existence longer than a music search backend and a book search backend (or any other search backends). If a user performs a search for "Lady Gaga", the meta search engine may display on top of the search results page, results from the app search backend (as a backend in existence for a longer period of time, the query-to-click ratios will be higher than the other backends), and then results from the books and music search backends.

Prior research has shown that consumers pay most attention to the top of the search results page, even if the results are not the most appropriate. Thus, using a query-to-click ratio based signal for corpora ordering in a meta search engine with an app search backend that has been functioning longer than other search backends, would result in applications, almost always, being first in the meta search engine search results. This would lead to consumers not discovering the other content verticals (i.e., the other search backends) that are being offered and thus never bring them to the top of the search results.

The present disclosure relates to a method and system for using data available on the World Wide Web (WWW), both in terms of related query popularity as well as the properties and signals of resulting web page results, for augmenting the signals available for ranking individual corpora in a meta search engine. Put another way, external signals (e.g., web-related signals) may be imported into a meta search engine as a way of classifying the content vertical (i.e., the search backends) most suited for a given query, to offset a potential bias from an unbalanced query-to-click ratio signals associated with one or more corpus within the meta search engine. For example, ranking of one or more corpus in the meta search engine may be achieved by calculating the likelihood of each query belonging to each of the corpus/search backends available to the meta search engine.

FIG. 1 is a block diagram illustrating a meta search engine architecture, in accordance with an example embodiment of the disclosure. Referring to FIG. 1, the meta search engine 100 may comprise a plurality of search backends 108, . . . , 112 (associated with corpus 1, . . . , corpus N, respectively), a multi-corpus ranker 104, and a corpora classification engine 106.

Each of the search backends 108, . . . , 112 and their associate corpus 1, . . . , corpus N may be individual search engines associated with a specific type of documents. For example, corpus 1 may be associated with music, corpus 2 may be associated with apps, corpus N may be associated with books, and so on. Additionally, each of the search backends 108, ..., 112 may comprise suitable circuitry, logic and/or code and may be operable to receive a search query from the multicorpus ranker 104 and return search results back to the ranker 104 via communication paths 116, ..., 120 (which may be wired and/or wireless).

The corpora classification engine 106 may comprise a CPU 107a, memory 107b and a ranker 107c. The ranker 107c may comprise suitable circuitry, logic and/or code and may be operable to determine a corpora classification likelihood based on a user search query received from the multi-corpus ranker 104. More specifically, the ranker 107c may use the received user search query as a web-based search query to search one or more web-based corpora, which may include documents of the types associated with search backends 108, ..., 112. The results of the web-based search may be classified using query-dependent and/or query independent scoring (example criteria for query independent scoring of search results is disclosed herein below in reference to FIG. 2B). The ranker 107c may then analyze a determined top X number of results (e.g., top 30 results) from the web-based search to determine a corpora classification distribution for corpus 1, ..., corpus N with regard to the user search query. For example, after analyzing the top 30 web-based search results, the ranker 107c may determine that most popular web-based search results are likely associated with corpus 2, then corpus 1, etc. In other words, the ranker 107c generates a classification likelihoods for the search backends 108, ..., 112 based on the results of the web-based search using the user search query.

The multi-corpus ranker 104 may comprise a CPU 105a and memory 105b, and may be operable to receive the search backends classification likelihoods (from the corpora classification engine 106) and the search backend search results (from search backends 108, ..., 112 associated with corpus 1, ..., corpus N, respectively). The multi-corpus ranker 104 may then generate the final corpus order and results 114, in response to the received user query 114.

In operation, a search query 102 from user 101 may be submitted to the multi-corpus ranker 104. The multi-corpus ranker 104 may communicate the search query 102 to each of the search backends 108, ..., 112 via communication paths 116, ..., 120, as well as to the corpora classification engine 106. The corpora classification engine 106 may then determine a corpora classification likelihood 122 for corpus 1, ..., corpus N with regard to the user search query 102, and may communicate the corpora classification likelihood 122 back to the multi-corpus ranker 104. Additionally, each of the search backends 108, ..., 112 may return its search results in relevance order back to the multi-corpus ranker 104. The multi-corpus ranker 104 may then generate the final corpus order and results 114 based on the search results (or scores) received from each search backend 108, ..., 112 as well as the corpora classification likelihood 122 for corpus 1, ..., corpus N with regard to the user search query 102.

Figure 2A:
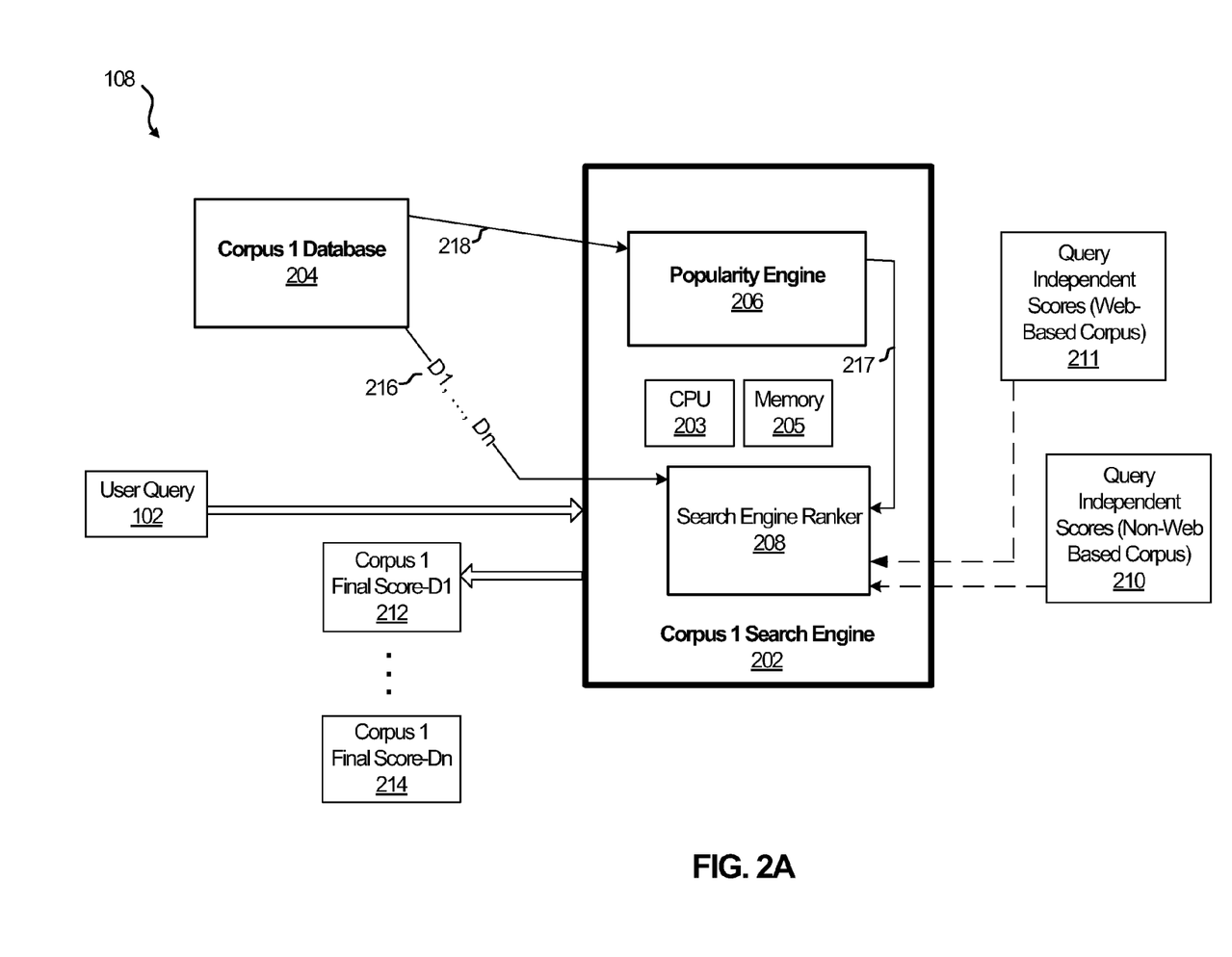
FIG. 2A is a block diagram of an example implementation of an individual search backend in a meta search engine, in accordance with an example embodiment of the disclosure.

FIG. 2A is a block diagram of an example implementation of an individual search backend in a meta search engine, in accordance with an example embodiment of the disclosure. Referring to FIG. 2A, the example search backend 108 may comprise a search engine 202 and a corpus 1 database 204.

The corpus 1 database 204 may be, for example, a music database and may comprise suitable circuitry, logic and/or code operable to provide raw music-related data to the search engine 202. For example, the database 204 may provide artist data, music album data, and track data.

The search engine 202 may comprise suitable circuitry, logic and/or code and may be operable to receive raw music-related data (e.g., documents 216, D1, ..., Dn) in response to user query 102 from user 101, and rank the received documents 216 based on the document final scores 212, ..., 214. The search engine 202 may comprise a CPU 203, a memory 205, a popularity engine 206 and a search engine ranker 208.

The popularity engine 206 may comprise suitable circuitry, logic and/or code and may be operable to calculate a query-independent popularity score 217 for one or more categories of documents received from the raw music database 204.

For example, the popularity engine 206 may comprise suitable circuitry, logic and/or code and may be operable to receive music track-related data, album-related data and/or artist-related data from the database 204 via the communication link 218. The popularity engine 122 may then calculate a query-independent popularity score for a given track, album and/or artist, respectively. For example, the query-independent popularity score 217 may be based on the number of search queries previously received within the search backend 108 about the specific music track, album and/or artist, as well as at least one of query-to-click ratio information and click-through ratio (CTR) information for at least one web page search result for the music track, album and/or artist. In this regard, the query-independent popularity score 217 may be one or more of a query-independent track popularity score, a query-independent album popularity score, and/or a query-independent artist popularity score.

Even though the popularity engine 206 is illustrated as implemented within the search engine 202, the present disclosure may not be limited in this regard. More specifically, the popularity engine 206 may be implemented separately from the search engine 202.

The search engine ranker 208 may comprise suitable circuitry, logic and/or code and may be operable to receive one or more documents 216 (e.g., documents D1, ..., Dn) in response to a user query 102. The search engine ranker 208 may then rank the received documents 216 based on a final ranking score 212, ..., 214 calculated for each document using one or more popularity scores 217 received from the popularity engine 206. The search engine ranker may generate the final ranking score 212, ..., 214 for each document based on the query-dependent score, as well as query-independent scores, such as the popularity scores 217 as well as other query-independent scores received from the query-independent score modules 210 and 211.

In accordance with an example embodiment of the disclosure, the search backend 108 may also comprise query-independent scores modules 210 and 211. The query-independent scores module 210 may comprise suitable circuitry, logic and/or code and may be used to communicate one or more query-independent scores for a given document. The query-independent score may be associated with non-web-based-corpora-relevant signals, such as signals related to a music search engine corpus (e.g., music database 204). The query-independent scores module 211 may comprise suitable circuitry, logic and/or code and may be used to communicate one or more query-independent scores for a given document. The query-independent score may be associated with web-based corpora with generic and non-web-based-corpora-relevant signals. The query-independent scores received from the query-independent scores modules 210-211 may be used by the search engine ranker 208 to generate the final ranking scores 212, ..., 214 of documents 216, D1, ..., Dn.

Even though the search engine 202, the database 204 and the query-independent scores modules 210-211 are all illustrated as separate blocks, the present disclosure may not be limited in this regard. More specifically, the database 204 and the query-independent scores modules 210-211 may be part of, and implemented within, the search engine 202 with all processing functionalities being controlled by the CPU 203. The CPU 203 may be operable to perform one or more of the processing functionalities associated with retrieving of information, as disclosed herein.

Figure 2B:
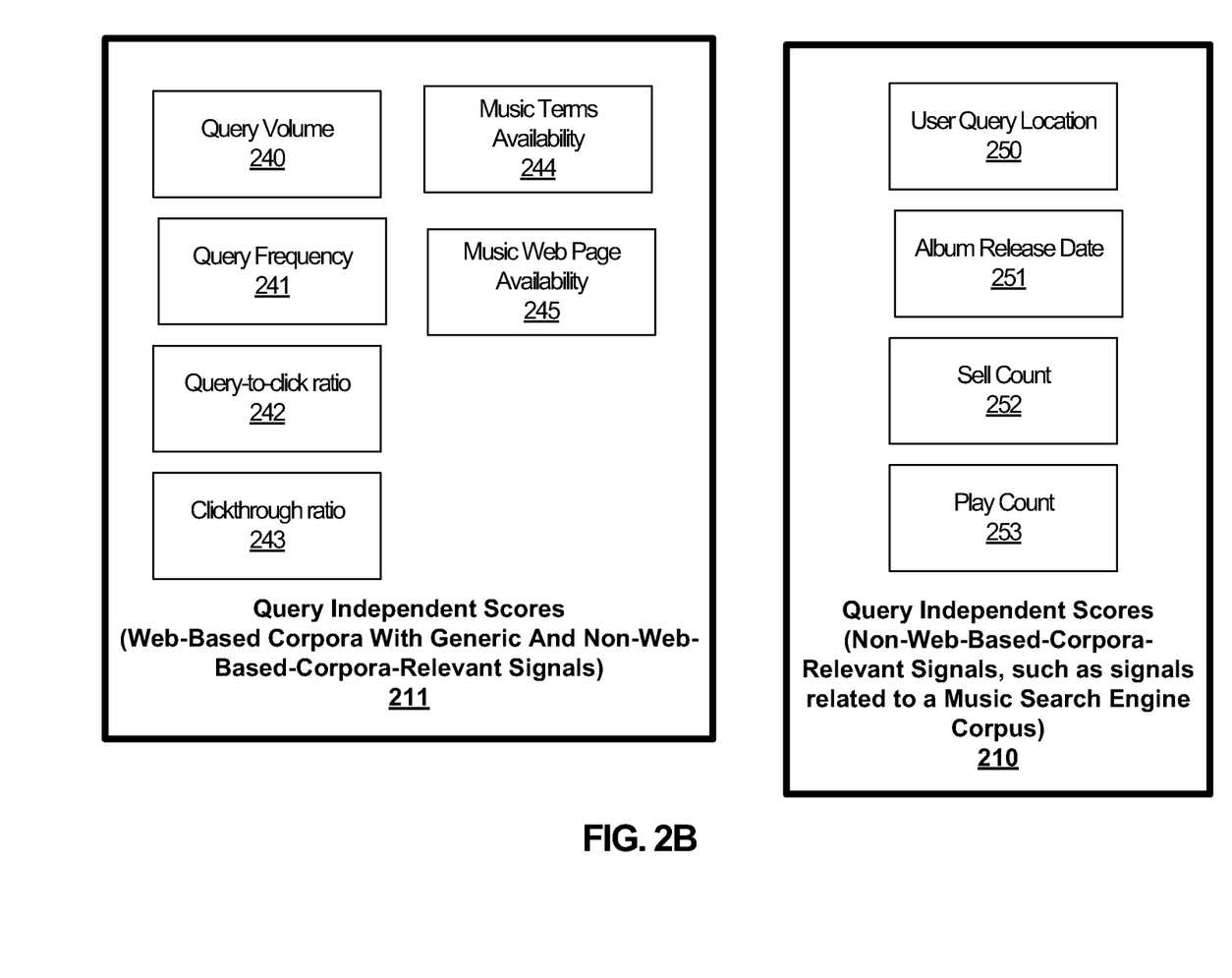
FIG. 2B is a block diagram of example implementations of a query-independent score modules using web-based and non-web based corpus signals, in accordance with an example embodiment of the disclosure.

Additionally, even though FIGS. 2A-2B disclose a more detailed implementation of a search backend 108, which is associated with a music database (corpus 1), similar implementation may be used for the other search backend 110, ..., 112 in the meta search engine 100 of FIG. 1.

FIG. 2B is a block diagram of example implementations of a query-independent score modules using web-based and non-web based corpus signals, in accordance with an example embodiment of the disclosure. Referring to FIG. 2B, the query-independent scores module 211 may comprise suitable circuitry, logic and/or code and may be used to communicate one or more query-independent scores for a given document, where the scores may be based on WWW signals for search results in a WWW-based corpus. The query-independent scores may be used by the search engine ranker 208 to generate the final ranking scores 212, ..., 214 of documents 216, D1, ..., Dn. More specifically, the query-independent scores module 211 may comprise a query volume module 240, a query frequency module 241, a query-to-click ratio module 242, a clickthrough ratio (CTR) module 243, a music terms availability module 244, and a music web page availability module 245.

The query volume module 240 and the query frequency module 241 may comprise suitable circuitry, logic and/or code and may be operable to provide scores associated with query volume and query frequency, respectively, of searches performed within a web-based information corpus. The query-to-click ratio module 242 and the click-through ratio module 243 may comprise suitable circuitry, logic and/or code and may be operable to provide scores associated with query-to-click ratios and click-through ratios, respectively, of web page search results for queries performed within the web-based information corpus.

The music terms availability module 244 may comprise suitable circuitry, logic and/or code and may be operable to provide scores based on availability of music-related terms in web page search results for queries performed within the web-based information corpus. The music web page availability module 245 may comprise suitable circuitry, logic and/or code and may be operable to provide scores based on whether or not individual web page search results, for queries performed within the web-based information corpus, include music-related web pages. In this regard, scores provided by the music terms availability module 244 and the music web page availability module 245 may be used to provide additional weight for web-based search results, when individual pages in such search results contain music-related terms or when the individual pages are entirely music-related.

Even though only six query-independent scores modules 240-245 (using web-based corpus signals) are listed with regard to the query-independent score module 211, the present disclosure is not limiting in this regard, and other query-independent scores may also be utilized by the search engine 202 in generating the final ranking scores 212, ..., 214.

Referring to FIG. 2B, the query-independent scores module 210 may comprise suitable circuitry, logic and/or code and may be used to communicate one or more query-independent scores for a given document, where the scores may be based on signals for search results in a non-web based corpus (e.g., a music search engine). The query-independent scores may be used by the search engine ranker 208 to generate the final ranking scores 212, ..., 214 of documents D1, ..., Dn. More specifically, the query-independent scores module 210 may comprise a user query location module 250, an album release data module 251, a sell count module 252, and a play count module 253.

Each of the modules 250-253 may comprise suitable circuitry, logic and/or code and may be operable to provide user query location information, album release data information, sell count information, or play count information, respectively, to the search engine ranker 208 for purposes of increasing the total ranking score of a given document. For example, if the user query 102 is about a specific music track by a given artist, the raw music database may locate and return back to the search engine 202 two tracks with the desired title and by the desired artist (e.g., the artist may have released the same song in 2 different languages, for two different geographic markets). The popularity scores returned by the popularity engine 206 may be the same for both tracks (the same album and the same artist may result in the same total popularity score after the album and artist popularity scores are compounded for each track). In this instance, the user query location module 250 may be used to communicate the geographic location of the user query 102 (e.g., the location may be obtained based on the IP address of the user 101 sending the search query 102). If the geographic location is the same as one of the two geographic markets intended by the two versions of the song, then the track recorded in the same language as the language of the geographic location the user query 102 was received from may be given an additional score and, therefore, ranked higher in the final ranking score list 212, ..., 214.

Even though only four query-independent scores modules 250-253 (using non-web based corpus) are listed with regard to the query-independent score module 210, the present disclosure is not limiting in this regard, and other query-independent scores may also be utilized by the search engine 202 in generating the final ranking scores 212, ..., 214.

Figure 3:
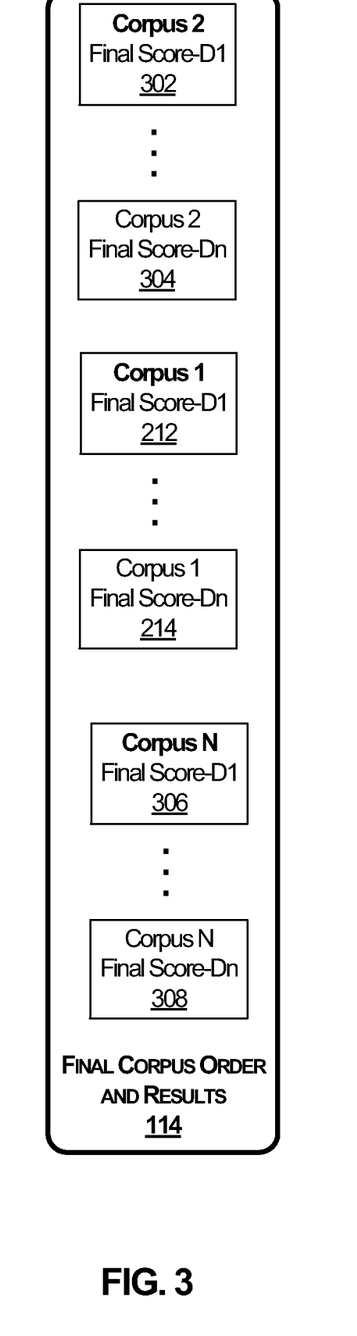
FIG. 3 is a block diagram illustrating example rendering of final corpus order and search results in a meta search engine, in accordance with an example embodiment of the disclosure.

FIG. 3 is a block diagram illustrating example rendering of final corpus order and search results in a meta search engine, in accordance with an example embodiment of the disclosure. Referring to FIGS. 1-3, after the search query 102 is received by the multi-corpus ranker 104, it may be communicated to each of the search backends 108, ..., 112 and to the corpora classification engine 106. The corpora classification engine 106 may then determine a corpora classification likelihood 122 for corpus 1, ..., corpus N with regard to the user search query 102, and may communicate the corpora classification likelihood 122 back to the multi-corpus ranker 104.

For example, the corpora classification engine may use a web-based search using the user search query 102 and may obtain final search result list with top 30 search results. The top 10 results may be apps, the next 10 results may be music-related documents, and the last 10 results may be book-related documents. Under this scenario, the corpora classification likelihood 122 may indicate a top classification for corpus 2 (app related), followed by corpus 1 (music related), and lastly corpus N (book related).

Additionally, each of the search backends 108, ..., 112 may return its search results in relevance order back to the multi-corpus ranker 104. For example, search backend 108 (associated with corpus 1) may return a final ranking score list 212, ..., 214 for the top documents (music related) searched within corpus 1. Similarly, search backend 110 (associated with corpus 2) may return a final ranking score list 302, ..., 304 for the top documents (app related) searched within corpus 2, and search backend 112 (associated with corpus N)

may return a final ranking score list 306, ..., 308 for the top documents (book related) searched within corpus N.

The multi-corpus ranker 104 may then generate the final corpus order and results 114, as illustrated in FIG. 3, based on the search results (or scores) received from each search back-end 108, ..., 112 as well as the corpora classification likelihood 122 for corpus 1, ..., corpus N with regard to the user search query 102. More specifically, since the corpora classification likelihood 122 indicates a top classification for corpus 2 (app related), followed by corpus 1 (music related), and lastly corpus N (book related), a similar arrangement of the search engines is reflected in the final corpus order and results 114 presented to the user 101.

Even though FIG. 3 indicates an example arrangement of search results based on corpora classification likelihoods determined based on top 30 web-based search results and using only corpus 1, corpus 2 and corpus N, the disclosure may not be limited in this regard. A different number of web-based search results may be used with the corpora classification likelihood associated with one or more of corpus 1, ..., corpus N.

Figure 4:
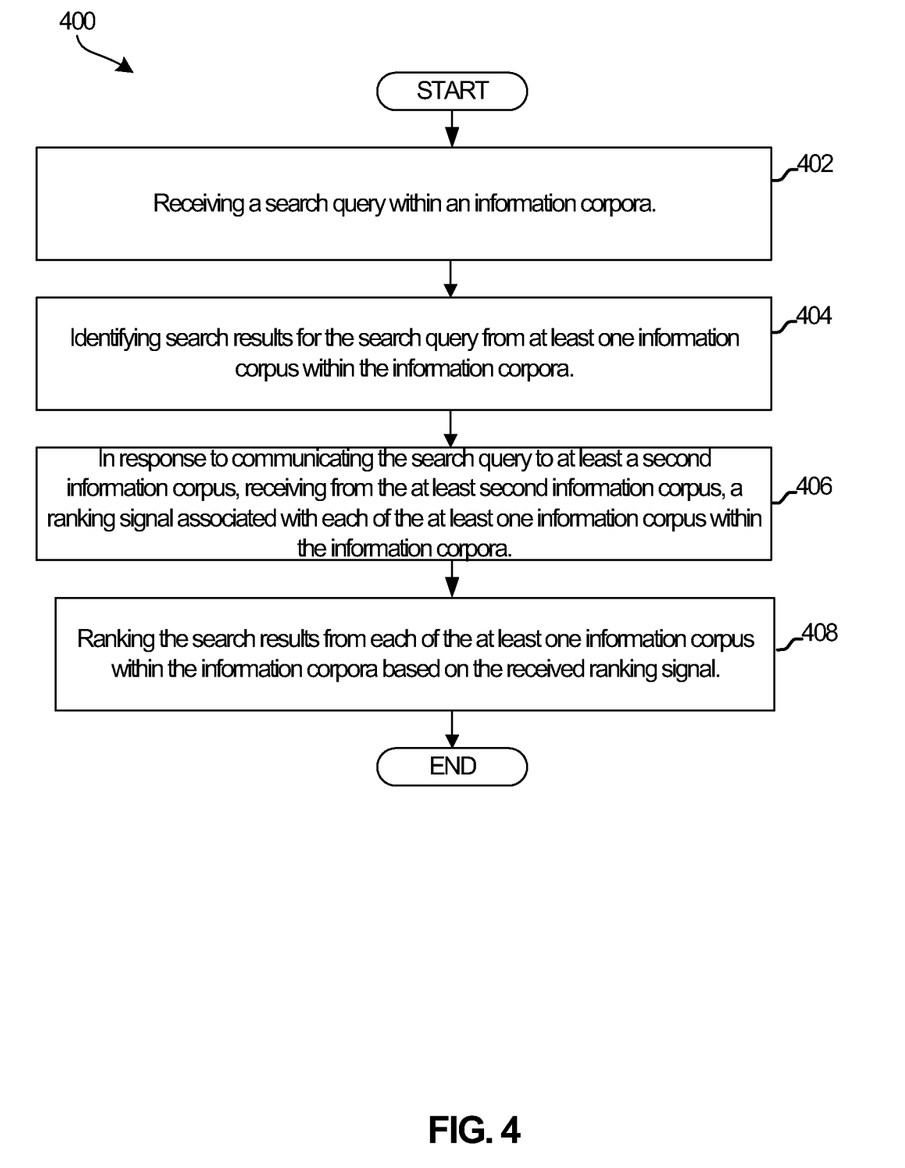
FIG. 4 is a flow chart illustrating example steps of a method for retrieving information in a meta search engine, in accordance with an example embodiment of the disclosure.

FIG. 4 is a flow chart illustrating example steps of a method for retrieving information in a meta search engine, in accordance with an example embodiment of the disclosure. Referring to FIGS. 1-4, the example method 400 may start at 402, when a search query 102 may be received within the meta search engine 100. At 404, search results for the search query may be identified from at least one information corpus within the information corpora (e.g., search results 212, ..., 214; 302, ..., 304; and 306, ..., 308 from corpus 1, corpus 2, and corpus N, respectively). At 406, in response to communicating the search query (102) to at least a second information corpus (e.g., the web-based corpora classification module 106), a ranking signal associated with each of the at least one information corpus within the information corpora (e.g., corpora classification likelihood 122) may be received from the at least second information corpus (106). The ranking signal (122) may be based on classification of search results after a search of the search query (102) using the at least second information corpus (106). The "small" information corpora may include at least one corpus that is a subset of the WWW-based (or web-based) corpora, or at least one corpus that is partially or completely non-overlapping with the web-based corpora, e.g., the at least second information corpus (106).

At 408, the multi-corpus ranker 104 may rank the search results from each of the at least one information corpus (e.g., search backends 108, ..., 112) within the information corpora based on the received ranking signal (e.g., 122). The "small" information corpora (corpus 1, ..., N) may include at least one corpus that is a subset of the WWW-based (or web-based) corpora, or at least one corpus that is partially or completely non-overlapping with the web-based corpora (e.g., 106).

The ranking of the search results may include ordering the search results based on search scores associated with the search query (e.g., the search scores 212, ..., 214; 302, ..., 304; and 306, ..., 308 received from each of the at least one information corpus within the information corpora), and the received ranking signal (122) associated with classification likelihood of each of the at least one information corpus (corpus 1, ..., corpus N). The ranking signal associated with each of the at least one information corpus may include a first score signal based on one or both of query volume and query frequency of a search performed within the at least second information corpus (106) for the search query (102). The ranking signal associated with each of the at least one information corpus may include a second score signal based on at least one popularity metric for at least one web page search result of the search performed within the at least second information corpus (106) for the search query. The at least one popularity metric may include at least one of query-to-click ratio information and click-through ratio (CTR) information for the at least one web page search result.

Figure 5:
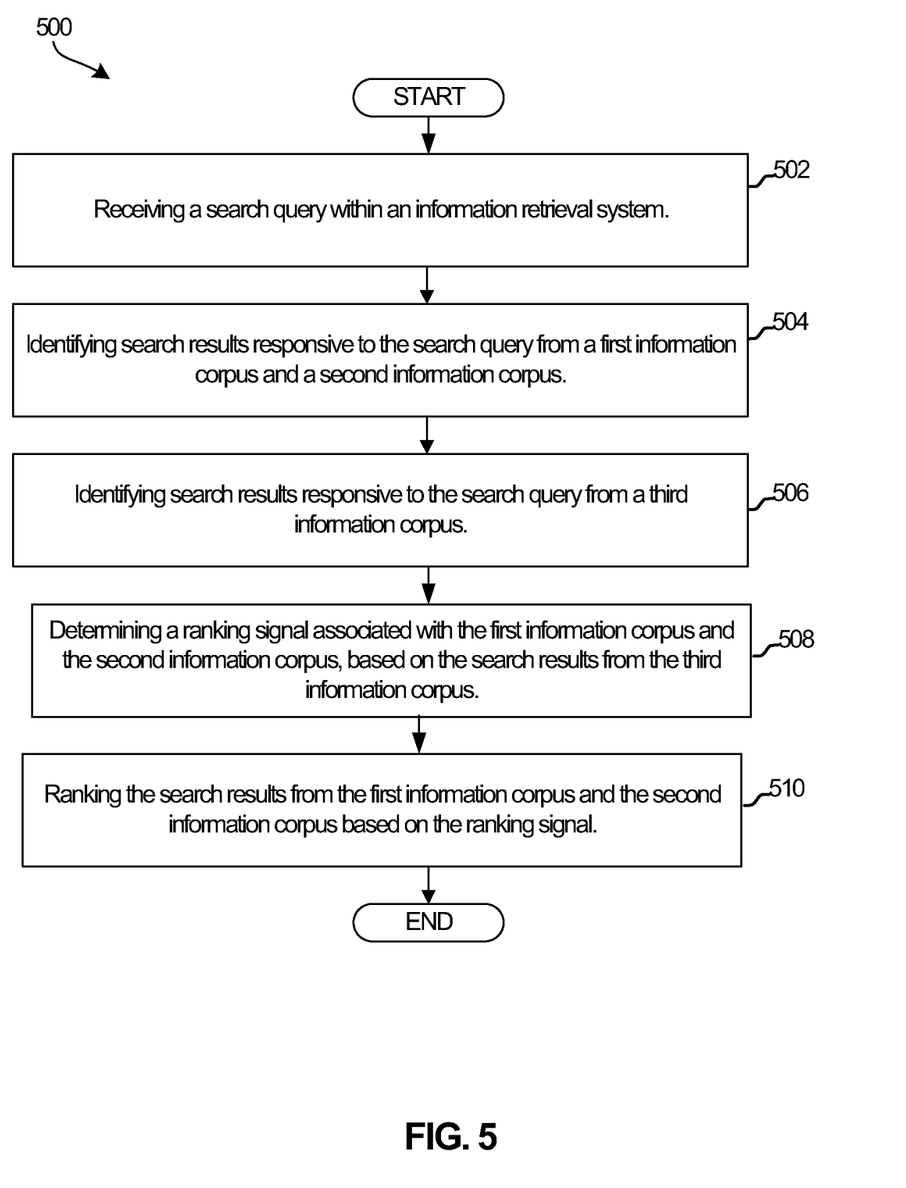
FIG. 5 is a flow chart illustrating example steps of another method for retrieving information in a meta search engine, in accordance with an example embodiment of the disclosure.

FIG. 5 is a flow chart illustrating example steps of another method for retrieving information in a meta search engine, in accordance with an example embodiment of the disclosure. Referring to FIGS. 1-5, the example method 500 may start at 502, when a search query (102) may be received within an information retrieval system (e.g., the meta-search engine 100). At 504, the multi-corpus ranker 104 may identify search results responsive to the search query (102), which results may be received from a first information corpus (e.g., one of corpus 1, ..., N) and a second information corpus (e.g., another one of corpus 1, ..., N). At 506, the multi-corpus ranker 104 may identify search results responsive to the search query (102), which results may be received from a third information corpus (e.g., the web-based corpora classification engine 106 associated with at least one web-based corpus). At 508, the multi-corpus ranker 104 may determine a ranking signal associated with the first information corpus and the second information corpus, based on the search results from the third information corpus. At 510, the multi-corpus ranker 104 may rank the search results from the first information corpus and the second information corpus based on the ranking signal.

Other implementations may provide a non-transitory computer readable medium, storage medium and/or storage device, and/or a non-transitory machine readable medium, storage medium and/or storage device, having stored thereon, a machine code and/or a computer program having at least one code section executable by a machine and/or a computer, thereby causing the machine and/or computer to perform the steps as described herein for retrieving information.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. There-

What is claimed is:

1. A method for retrieving information, comprising:
receiving a search query within an information retrieval system;
identifying search results responsive to the search query from a first information corpus and a second information corpus, wherein the first information corpus and the second information corpus each correspond to different search engines selected from:
a music search engine for searching one or more of a music track, a music album, and a music artist,
an application (app) search engine for searching apps,
a movie search engine for searching movies, and
a book search engine for searching books;
identifying search results responsive to the search query from a third information corpus, wherein the third information corpus comprises external information that relates to previous queries and to information about the subject of the query;
determining a ranking signal associated with the first information corpus and the second information corpus, based on the search results from the third information corpus; and ranking the search results from the first information corpus and the second information corpus based on the ranking signal,
wherein, if the ranking signal indicates that the first information corpus is more relevant to the query than the second information corpus, all results from the first corpus are ranked ahead of all results from the second corpus.

2. The method according to claim 1, wherein:
at least one of the first information corpus and the second information corpus comprises a non-WWW-based information corpus;
the third information corpus comprises a WWW-based information corpus; and
the ranking signal is based on classification of the search results from the third information corpus.

3. The method according to claim 1, wherein the ranking of the search results comprises:
ordering the search results based on:
search scores associated with the search query, the search scores received from the first information corpus and the second information corpus; and
the received ranking signal associated with the first information corpus and the second information corpus.

4. The method according to claim 1, wherein the ranking signal associated with the first information corpus and the second information corpus comprises a first score signal based on one or both of query volume and query frequency of a search performed within the third information corpus for the search query.

5. The method according to claim 4, wherein the ranking signal associated with the first information corpus and the second information corpus comprises a second score signal based on at least one popularity metric for at least one web page search result of the search performed within the third information corpus for the search query.

6. The method according to claim 5, wherein the at least one popularity metric comprises at least one of query-to-click ratio information and click-through ratio (CTR) information for the at least one web page search result.

7. A system for retrieving information, comprising:
a network device comprising at least one processor coupled to memory, the network device operable to:
receive a search query within an information retrieval system;
identify search results responsive to the search query from a first information corpus and a second information corpus, wherein the first information corpus and the second information corpus each correspond to different search engines selected from:
a music search engine for searching one or more of a music track, a music album, and a music artist,
an application (app) search engine for searching apps,
a movie search engine for searching movies, and
a book search engine for searching books;
identify search results responsive to the search query from a third information corpus, wherein the third information corpus comprises external information that relates to previous queries and to information about the subject of the query;
determine a ranking signal associated with the first information corpus and the second information corpus, based on the search results from the third information corpus; and
rank the search results from the first information corpus and the second information corpus based on the ranking signal,
wherein, if the ranking signal indicates that the first information corpus is more relevant to the query than the second information corpus, all results from the first corpus are ranked ahead of all results from the second corpus.

8. The system according to claim 7, wherein:
at least one of the first information corpus and the second information corpus comprises a non-WWW-based information corpus;
the third information corpus comprises a WWW-based information corpus; and
the ranking signal is based on classification of the search results from the third information corpus.

9. The system according to claim 7, wherein during the ranking of the search results, the network device is operable to:
order the search results based on:
search scores associated with the search query, the search scores received from the first information corpus and the second information corpus; and
the received ranking signal associated with the first information corpus and the second information corpus.

10. The system according to claim 7, wherein the ranking signal associated with the first information corpus and the second information corpus comprises a first score signal based on one or both of query volume and query frequency of a search performed within the third information corpus for the search query.

11. The system according to claim 10, wherein the ranking signal associated with the first information corpus and the second information corpus comprises a second score signal based on at least one popularity metric for at least one web page search result of the search performed within the third information corpus for the search query.

12. The system according to claim 11, wherein the at least one popularity metric comprises at least one of query-to-click ratio information and click-through ratio (CTR) information for the at least one web page search result.

13. A machine-readable storage device, having stored thereon a computer program having at least one code section for retrieving information, the at least one code section executable by a machine for causing the machine to perform a method comprising: receiving a search query within an information retrieval system;

identifying search results responsive to the search query from a first information corpus and a second information corpus, wherein the first information corpus and the second information corpus each correspond to different search engines selected from:
        a music search engine for searching one or more of a music track, a music album, and a music artist,
        an application (app) search engine for searching apps,
        a movie search engine for searching movies, and
        a book search engine for searching books;
    identifying search results responsive to the search query from a third information corpus, wherein the third information corpus comprises external information that relates to previous queries and to information about the subject of the query;
    determining a ranking signal associated with the first information corpus and the second information corpus, based on the search results from the third information corpus; and ranking the search results from the first information corpus and the second information corpus based on the ranking signal,
    wherein, if the ranking signal indicates that the first information corpus is more relevant to the query than the second information corpus, all results from the first corpus are ranked ahead of all results from the second corpus.

14. The machine-readable storage device according to claim 13, wherein:
    at least one of the first information corpus and the second information corpus comprises a non-WWW-based information corpus;
    the third information corpus comprises a WWW-based information corpus; and
    the ranking signal is based on classification of the search results from the third information corpus.

15. The machine-readable storage device according to claim 13, wherein the ranking of the search results comprises code for:
    ordering the search results based on:
        search scores associated with the search query, the search scores received from the first information corpus and the second information corpus; and
        the received ranking signal associated with the first information corpus and the second information corpus.

16. The machine-readable storage device according to claim 13, wherein the ranking signal associated with the first information corpus and the second information corpus comprises a first score signal based on one or both of query volume and query frequency of a search performed within the third information corpus for the search query.

17. The machine-readable storage device according to claim 16, wherein the ranking signal associated with the first information corpus and the second information corpus comprises a second score signal based on at least one popularity metric for at least one web page search result of the search performed within the third information corpus for the search query, wherein the at least one popularity metric comprises at least one of query-to-click ratio information and click-through ratio (CTR) information for the at least one web page search result.

* * * * *